Sept. 2, 1924.  1,507,395
R. D. MERSHON
PROTECTING CONDENSER PARTS AGAINST CORROSION
Filed Sept. 14, 1920   2 Sheets-Sheet 1

INVENTOR
R. D. Mershon
BY
Kerr, Page, Cooper & Hayward
ATTORNEYS

Sept. 2, 1924.  
R. D. MERSHON  
1,507,395  
PROTECTING CONDENSER PARTS AGAINST CORROSION  
Filed Sept. 14, 1920  2 Sheets-Sheet 2

R. D. Mershon
INVENTOR

BY
Kerr, Page, Cooper & Hayward
ATTORNEYS

Patented Sept. 2, 1924.

1,507,395

UNITED STATES PATENT OFFICE.

RALPH D. MERSHON, OF NEW YORK, N. Y.

PROTECTING CONDENSER PARTS AGAINST CORROSION.

Application filed September 14, 1920. Serial No. 410,344.

*To all whom it may concern:*

Be it known that I, RALPH D. MERSHON, a citizen of the United States, residing at New York, county and State of New York, have invented certain new and useful Improvements in Protecting Condenser Parts Against Corrosion, of which the following is a full, clear, and exact description.

This invention relates to electrolytic condensers, and its chief object is to provide means for preventing, or at least diminishing, injury to the tank or cell, supporting racks, and other metal parts in contact with the electrolyte, occasioned by mechanical, chemical or electrochemical attack. To this and other ends the invention consists in the novel features hereinafter described.

Referring to the drawings.

Figure 1:
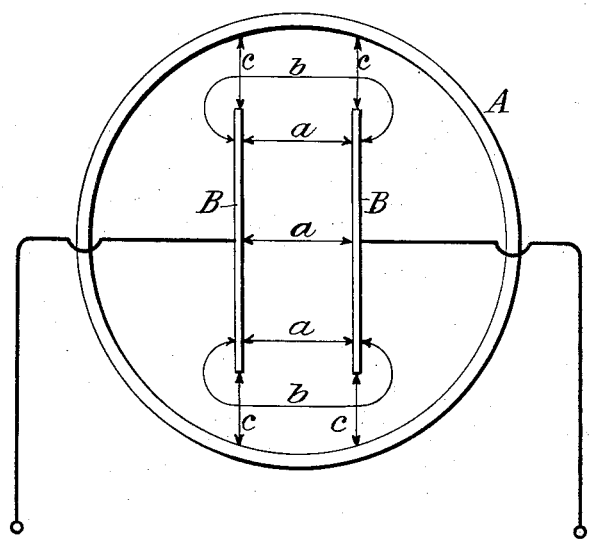
Fig. 1 is a diagram illustrating the current paths in an electrolytic condenser.

If the tank or vessel containing the electrolyte of an electrolytic condenser is composed of a non-filming metal, that is, a metal which does not take on a dielectric film as does aluminum, magnesium, etc., the metal will be liable to suffer injury by corrosion, due to chemical attack by the electrolyte, or to electrochemical attack due to stray currents. The ultimate result is destruction of the tank, and in addition impurities are introduced into the electrolyte which may be detrimental to the condenser. If the tank is composed of or lined with the metal not subject to chemical attack by the electrolyte it will nevertheless, in most cases at least, suffer injury by electrochemical action since few metals, not even gold, can withstand such action. Moreover, if the electrolyte is in rapid motion, especially where a pump or other means is used for the purpose, more or less mechanical erosion or wear will occur, particularly if, as is sometimes the case, the electrolyte contains alumina or other insoluble substance in suspension.

The injury caused by chemical or electrochemical action can be avoided by using a tank made of glass, or porcelain, or metal covered inside with enamel. The first of these expedients is objectionable on the score of fragility; the second on the score of weight; and the third on the score of expense, and for the further reasons that it is extremely difficult to obtain metal tanks lined with porcelain or enamel free from pin-holes or other flaws through which the electrolyte can find access to the underlying metal.

What has been said with regard to the tank applies equally, or with even greater force to the metal parts, other than the "active" parts (that is, the filmed electrodes or anodes, the busbars, etc.). Among the parts referred to may be mentioned the rack for supporting or positioning the electrodes, the tubes, partitions or other guides for directing the flow of the electrolyte, the pump and its impeller, etc.

Because of the desirability of making the tank of metal, and of avoiding injurious contamination of the electrolyte by introducing impurities therein, it has been my custom to make tank and other "inactive" parts of the same metal as is used for the active parts, usually aluminum, since in that case erosion and corrosion of the tank and other parts will not produce a substance detrimental to the operation and life of the condenser. Inasmuch as aluminum is used almost universally in condensers it will be dealt with in what follows, but it will be understood that what is said with regard to aluminum applies also to other metals having similar properties for the same purpose.

As already intimated aluminum is subject to injury when used in the tank and other inactive parts. Being a soft metal it is subject to mechanical erosion, especially if, as is often the case, the electrolyte carries any considerable amount of alumina. Such electrolytes as are usually employed have only a slight chemical action upon it, but the electrolytic corrosive action of stray currents affects it markedly, wherever these currents flow into the metal. Since the stray currents are mainly alternating it follows that any spot (on the inactive metal parts), which constitutes the end of the path of one of the stray currents, will have a current flowing alternately into and out of it.

The reason for these stray currents in the inactive metal will be clear from a consideration of Fig. 1, which represents diagrammatically a simple condenser without excitation. In the figure, A is the tank or cell, composed of filming metal but unfilmed, and B, B the active electrodes, immersed in any suitable electrolyte. When alternating current is impressed on the condenser there will flow through the electrolyte, between the inner faces of the electrodes, a condenser current indicated by the double arrows $a$. Between the outer faces there will also be current through the electrolyte, along paths indicated by the arrows $b$; or, if the electrodes are perforated, part of this current will flow along paths $b$ and part through the perforations and along paths $a$. But the electrolyte has an appreciable resistance, and by reason of the condenser current in paths $a$ and $b$ there will be a drop of voltage or fall of potential along these paths such that a part of the current, instead of being confined to the electrolyte, will tend to flow into, out of, and through the tank wall, as indicated by the arrows $c$, and if, as is usually the case, the drop mentioned is great enough, that is, if the resistance of paths $a$ and $b$ is great enough, current will flow through such paths as are indicated generally by $c$. This current is alternating, and when it flows out of the tank wall, it will form a film opposing its flow, but when its direction is reversed the film will be broken down, similar actions taking place at the other end of the current path. The film cannot, however, form quickly enough to entirely prevent the flow of current, and hence when the condenser is in operation there will be an alternate building up and breaking down of the film at the ends of the current path, resulting in severe damage and ultimate destruction of the tank.

Figure 2:
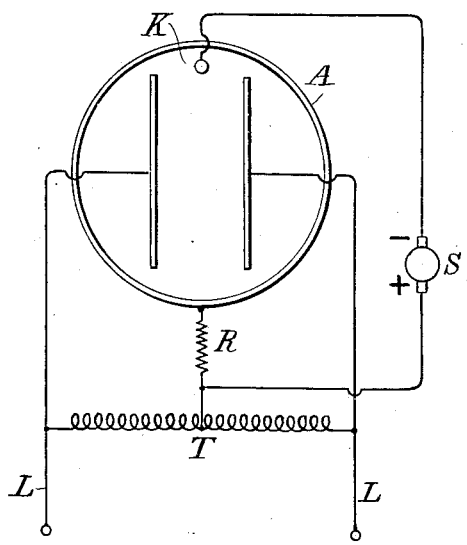
Figs. 2, 3, 4 and 5 illustrate various ways of applying my invention.

My present invention provides a simple and effective way of avoiding the trouble outlined above. For this purpose the tank (or at least its inner surface), and the other inactive parts of the condenser which are in contact with the electrolyte are made of film-forming metal, usually of aluminum, and are provided with a film like that on the active parts or anodes, preferably by the method described in my prior Patent No. 1,012,889, issued December 26, 1911, at a temperature of 100° C. or higher, so as to make the film heat-resistant. Such a film is hard and effectually resists the mechanically erosive effect of liquid currents, and also is markedly resistant to the electro-chemical action, and the apparatus will therefore have much longer life. In order, however, to make the resistance to electrolytic or electro-chemical corrosion complete and permanent provision is made for maintaining the film and preventing flow of current into the inactive parts (by which I mean the tank as well as the rack, guides, and other parts hereinbefore mentioned). This is effected by maintaining a substantially constant electrostatic stress directed from the metal to the electrolyte. This is most conveniently done by connecting the film-coated inactive parts to the positive pole of a source of unidirectional voltage and the electrolyte to the negative pole, which source, in the case of an excited condenser, may be the source of the excitation voltage, as in Fig. 2. This figure shows an excited condenser, that is, one in which the negative charge in the electrolyte is maintained from an external source, as explained in my prior Patent No. 1,077,628, issued November 4, 1913. In the figure mentioned, the positive pole of the unidirectional source S is connected to the neutral point of a balance coil, choke coil, or autotransform T which is itself connected across the condenser terminals or leads L, L, while the negative pole is connected to the "cathode" K, in the present instance a rod of carbon, nickel, or other non-filming material of suitable character, immersed in the electrolyte. By this means the unidirectional E. M. F. of the source S is opposed to the E. M. F. produced by the rectifier action of the condenser, as explained in my prior Patent No. 1,077,628 referred to above.

According to my present invention I also oppose a unidirectional E. M. F. to the stray currents tending to flow from the electrolyte into the inactive parts, by connecting the inactive parts to the positive pole of the exciting source S; the tank A, in the present instance representing such inactive parts. Inasmuch as it is the currents into the metal that produce the injurious effects, it will be seen that with an opposing voltage of sufficient value maintained on the inactive parts such currents can be completely eliminated or can be diminished to any desired extent.

Figure 3:
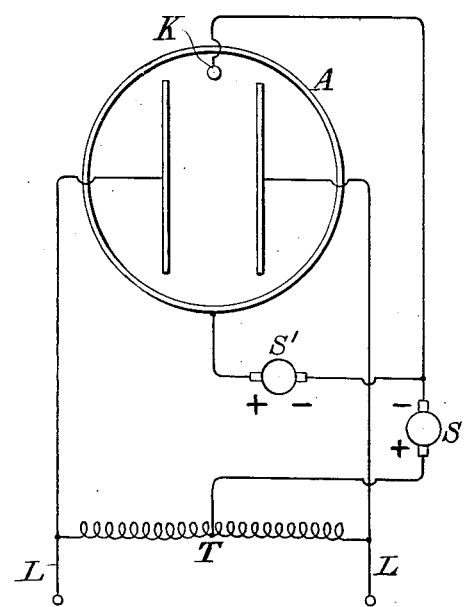
Figure 4:
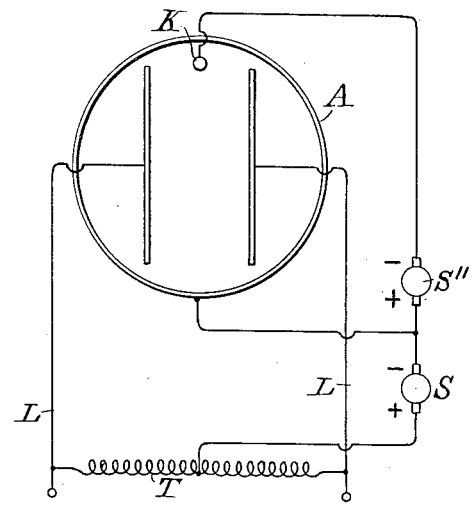

Usually it is not necessary to impress the full excitation voltage upon the inactive parts. In such case a resistance, as R, may be included in the protecting circuit, between the balance coil and the tank. Fig. 3 illustrates another method of supplying the protecting voltage, a separate source S' being provided, with its positive pole connected to the inactive parts and its negative pole to the similar pole of the exciting source S. Still another method is shown in Fig. 4, in which the protecting source S" has its negative pole connected to the cathode K and its positive pole both to the tank and to the negative pole of the source S. In both these methods the protecting voltage can be as much less than the exciting voltage as may be desired.

Figure 5:
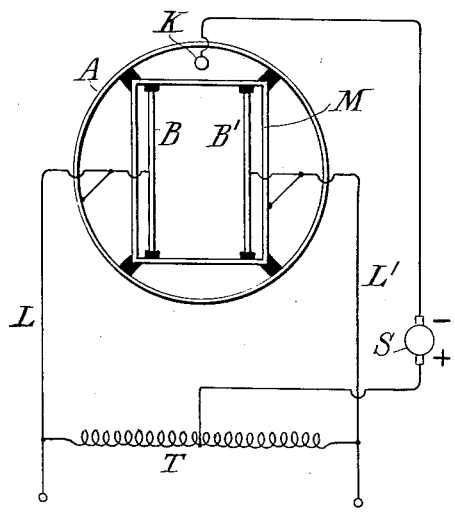

In still another form of the invention the tank and other parts which are to be protected are made of filming metal as before, but insulated from each other, and some of them are connected with one of the groups of active electrodes, or "anodes" as they may be conveniently termed in the case of an excited condenser, and the others are connected with the other group of anodes and with the tank. The tank and other parts are thus made "active." This form of the invention is illustrated in Fig. 5, in which the tank A is connected to a terminal L, of the condenser. M is a rack in which the anodes B, B' are supported, and is also intended to represent other parts, such for example as the guides by which the flowing electrolyte is directed, as in my copending application Serial No. 361,898, filed February 27, 1920, now Patent No. 1,433,736, issued October 31, 1922. The parts M are, as indicated in the figure, connected to the other terminal, L'. Consequently the parts M constitute an anode, and the tank constitutes another anode, thus becoming active parts of the condenser. Voltage from the source S (which in the present instance also serves to excite the condenser) then maintains on all the parts,—anodes, tank, rack, guides, pump, etc., an electrostatic stress in opposition to stray currents tending to flow into the metal, thereby protecting the films from perforation. In general the immersed surface of the parts connected to one terminal and the immersed surface of the parts connected to the other terminal should be equal in area, since any substantial difference in that particular would result in an unbalanced condition, as will be readily understood.

Figure 6:
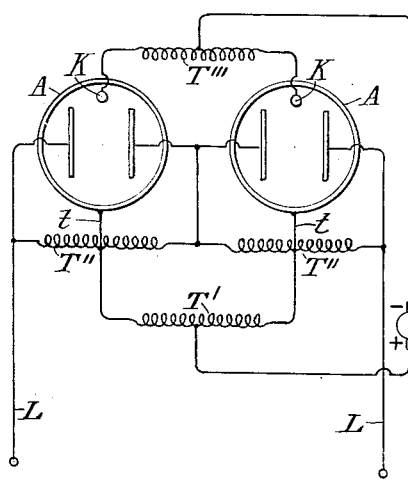
Figs. 6 and 7 illustrate methods of applying the invention to condensers in series with excitation from a single source of unidirectional current.
Figure 7:
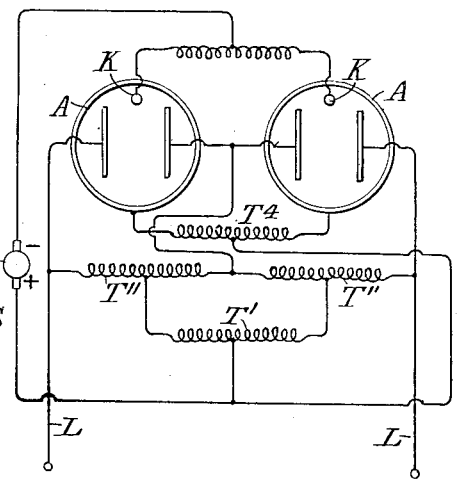

My present invention lends itself equally well to the protection of condensers in series or in multiple but excited from a single source of unidirectional current, for example as described in my copending application Serial No. 181,430, filed July 18, 1917, now Patent No. 1,439,926, issued December 19, 1922. A simple and effective arrangement for the purpose is illustrated in Fig. 6. In this figure, which shows two condensers in series, the exciting voltage from the source S is supplied to the neutral point of an autotransformer T' which has its terminals connected to the neutral points of autotransformers T'', the latter being themselves connected across the terminals of the respective condensers. The negative pole of the exciting source is connected to the neutral point of an autotransformer T''' connected between the cathodes K. The connections described not only connect the condenser anodes in multiple to the source S, thus splitting up the exciting current, but the autotransformers, by their transformer action when alternating current is impressed in the main terminals L, L, produce counter E. M. F.'s opposing alternating voltages existing between the paths of the split currents, so that these alternating voltages are never short-circuited. Now to protect the inactive parts against electrolytic corrosion in accordance with the present method, it is only necessary to connect such parts (represented in the figure by the tanks A) to the autotransformer T', for example to its terminals as shown at $t, t$. The arrangement illustrated in Fig. 7 is similar, but employs a separate autotransformer or balance coil, T⁴, for the protecting voltage.

It is to be understood that the invention is not limited to the specific features herein illustrated and described but can be embodied in other forms and practised in other ways without departure from its spirit. By the expression "inactive parts" and the like in the appended claims I mean any or all such parts as the tank, rack, supports, guides, pipes, etc., whether they are actually "inactive" or are so connected with the condenser elements or terminals as to be directly subjected to the alternating current impressed upon the condenser.

I claim—

1. The herein described method of protecting the inactive parts of an electrolytic condenser, which consists in making of filming metal the part to be protected, forming a film thereon, and when the condenser is in operation maintaining on such film an electrostatic stress directed toward the electrolyte.

2. The herein described method of protecting the inactive parts of an electrolytic condenser, which consists in making of filming metal the part to be protected, forming a film thereon, and when the condenser is in operation supplying to such filmed part unidirectional voltage in opposition to currents tending to flow into the part from the electrolyte.

3. The herein described method of protecting the inactive parts of an electrolytic condenser, which consists in making of filming metal the part to be protected, forming a film thereon, connecting the filmed part to a terminal of the condenser, and when the condenser is in operation maintaining on such film an electrostatic stress directed toward the electrolyte.

4. The herein described method of protecting the inactive parts of an electrolytic condenser, which consists in making of filming metal the part to be protected, forming a film thereon, connecting the filmed part with a terminal of the condenser, and impressing upon the condenser terminals unidirectional voltage opposing flow of current into such parts from the electrolyte.

5. In an electrolytic condenser, a tank for the electrolyte, composed of film-forming metal and having a film on its surface in contact with the electrolyte; and means for impressing upon the tank a voltage opposing flow of current to the tank from the electrolyte.

6. In an electrolytic condenser, an inactive part composed of filming metal and having a film in contact with the electrolyte; and a source of unidirectional voltage having its positive pole connected with said inactive part and its negative pole connected with the electrolyte to oppose flow of currents from the electrolyte into said inactive part.

7. In an electrolytic condenser having anodes and a cathode, an inactive part composed of filming metal and having a film, and a source of unidirectional voltage having its negative pole connected to the cathode and its positive pole connected with the anodes and said inactive part.

8. In an electrolytic condenser, having anodes and a cathode, a tank for the electrolyte, composed of filming metal and having a film in contact with the electrolyte, the tank being electrically connected with one group of anodes but insulated from the other group of anodes, a part composed of filming metal and having a film in contact with the electrolyte, said part being electrically connected with the other anode but insulated from the tank, and a source of unidirectional voltage having its negative pole connected to the cathode and its positive pole connected to both anodes or group of anodes.

9. In an electrolytic condenser, anodes and a cathode immersed in the electrolyte, other parts in the electrolyte, composed of filming metal and having film-coated surfaces in contact with the electrolyte, one or more of said parts being electrically connected with one group of anodes, and one or more of said parts being electrically connected with the other group of anodes and a source of unidirectional voltage having its negative pole connected with the cathode and its positive pole with both anodes or groups of anodes.

10. An electrolytic condenser having inactive as well as active parts made of filming metal coated with a protective film.

11. In an electrolytic condenser, a tank having its surface in contact with the electrolyte made of filming metal coated with a protective film.

In testimony whereof I hereto affix my signature.

RALPH D. MERSHON.